April 15, 1930.                E. H. W. FOOT                 1,754,311
                           ROTARY TILLING MACHINE
                             Filed July 3, 1929

Inventor
Edward H. W. Foot
by Wilkinson & Giusta
Attorneys.

Patented Apr. 15, 1930

1,754,311

UNITED STATES PATENT OFFICE

EDWARD HAMMOND WHALLEY FOOT, OF LINCOLNSHIRE, ENGLAND

ROTARY TILLING MACHINE

Application filed July 3, 1929, Serial No. 375,775, and in Great Britain May 24, 1928.

This invention relates to rotary tilling machines of the kind in which a plurality of digging tines are mounted in each of a number of brackets on a rotary shaft, scraper or cleaner tools for the tines being usually carried by a second shaft.

This invention is further of the type in which cutter blades and digging tines are alternately arranged on the same boss or hub on a shaft to till the soil.

According to the present invention, the tines and the cutting blades or coulters are both formed as units separate from the hub on which they are mounted, the tines and coulters being mounted alternately in a single bracket. This bracket is in the form of a circular hub formed with a flange on each side so that there is between the flanges an annular groove or recess in which the inner ends of the tines or cutting tools are housed.

The invention is illustrated in the annexed drawing in which:—

Figure 1:
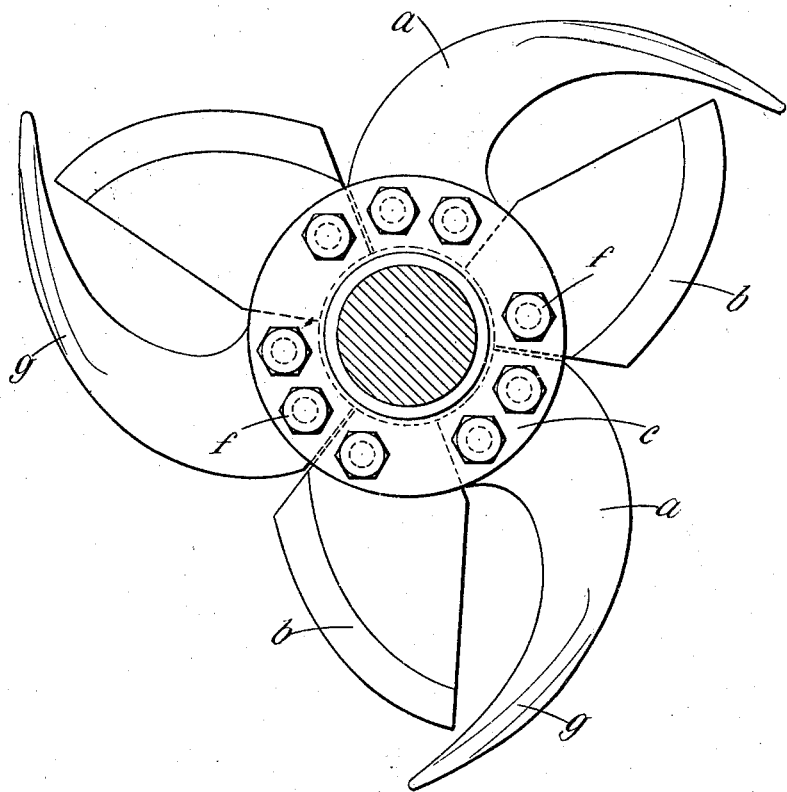
Figure 2:
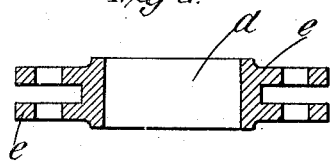

Fig. 1 is a side elevation of the device, and
Fig. 2 is a detail in sectional plan of the circular bracket.

In the construction illustrated three digging tines $a$ and three cutting blades $b$ are employed in each group, a tine being interposed between two cutter blades. Both the tines $a$ and cutters $b$ are mounted in a single circular hub $c$ having a central opening $d$ for the passage of the driving shaft. The hub $c$ is formed with two circular flanges $e$ leaving between them an annular groove, as shown in Fig. 2. The tines $a$ and cutters $b$ are nipped between the flanges, and held in the groove by means of bolts $f$ that pass through each flange $e$. In the arrangement shown two bolts are provided for each tine $a$ and one for each cutter $b$, but this number may be varied, as may be the number of tines and cutters employed.

In order to enable a clod of earth to be torn laterally from the ground after being cut, a web or shoulder $g$ is formed on each tine.

Assuming the device to be rotating in a clockwise direction it will be seen that a cutter $b$ enters the soil in advance of, but to a less depth than, its tine $a$.

I claim:—

1. A rotary tilling machine in which a plurality of digging tines and a similar number of cutting blades are arranged alternately in a single bracket on a rotary shaft, the tines and cutting blades both being separate units from the hub on which they are mounted.

2. A rotary tilling machine according to claim 1, in which the bracket is in the form of a circular hub, having two similar circular flanges.

In testimony whereof I have signed my name to this specification.

EDWARD HAMMOND WHALLEY FOOT.